UNITED STATES PATENT OFFICE.

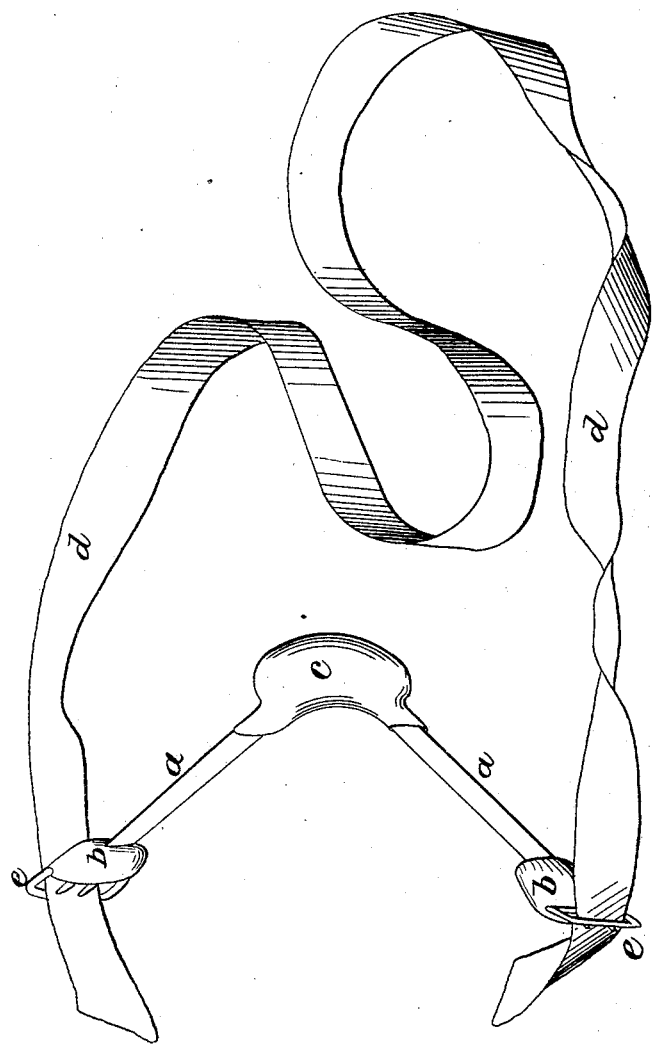

C. CAMPBELL, OF ST. LOUIS, MISSOURI.

TRUSS-PAD.

Specification of Letters Patent No. 21,548, dated September 21, 1858.

*To all whom it may concern:*

Be it known that I, CORNELIUS CAMPBELL, M. D., of the city of St. Louis, State of Missouri, have invented a new and improved mode of preventing effectually the escape of viscera through hernial openings in the human body by obtaining exact and perfect impressions of such openings by means of compression, in gutta-percha, and using the same for truss-pads, which, fitting with perfect accuracy to the openings and surrounding parts, completely prevent the escape of the contained viscera, and by exercising constant pressure upon the condensed cellular tissue, which constitutes the hernial rings, causing them to harden and contract, so as in many cases to produce a complete cure.

These pads can be placed on any of the known and approved truss springs.

To make these pads, marked $c$, as shown in the drawing, I take a piece of gutta percha of the desired size while in a soft state from having been immersed in hot water, and mold or form my pad, by hand, into a conical shape on a truss spring, and when it becomes cold and hard, I dip the apex in hot water to the extent of $\frac{1}{3}$ or $\frac{1}{2}$ the way toward the base, and retain it there until it becomes sufficiently soft to receive the impression of the hernial opening. I then adjust the spring to the body so as to bring the softened apex of the pad directly upon the hernial opening, when the strength of the spring forces the gutta percha down into it, where it is necessary that it should remain until it has cooled down and become sufficiently hard to retain its form. If the spring should not exert sufficient force, additional pressure, by the hand, may be added. The patient, when the impression is being taken, should remain in a reclining or recumbent position, which will place the abdominal muscles in a moderately relaxed state.

I have found gutta percha to be preferable to any other material, from its capability of being readily softened by heat, and from the fact of its giving out caloric so gradually, that it can be easily borne on the skin without pain at a high temperature. I have found it necessary, also, to cover the gutta percha and all other substances that have a tendency to irritate the skin, with gold-leaf, silver-leaf, tin-foil, or any other suitable material, in order to prevent chafing.

The night truss, represented by the drawing, consists of the combination of the spring $a$, with the steadying pads $b$ $b$, in addition to the hernial pad $c$, for the purpose of steadying it; and also the elastic strap $d$, which is attached at both ends of the pads $b$ $b$, by means of the buckles $e$ $e$, the object of which is to reach around the body and tighten the spring, by the use of the buckles $e$ $e$.

I do not claim the mode or art of casting or molding gutta percha into any desired shape; but what I do claim as my invention, and desire to secure by Letters Patent, is—

The application of pads made of gutta percha in the manner described in this specification, for the prevention of the escape of viscera through hernial openings in the human body.

CORNELIUS $\overset{\text{his}}{\times}$ CAMPBELL.
<div style="text-align:center">mark</div>

Witnesses:
JAMES A. CAMPBELL,
ENGLEBERT VOERSTER.